United States Patent Office 3,319,493
Patented May 16, 1967

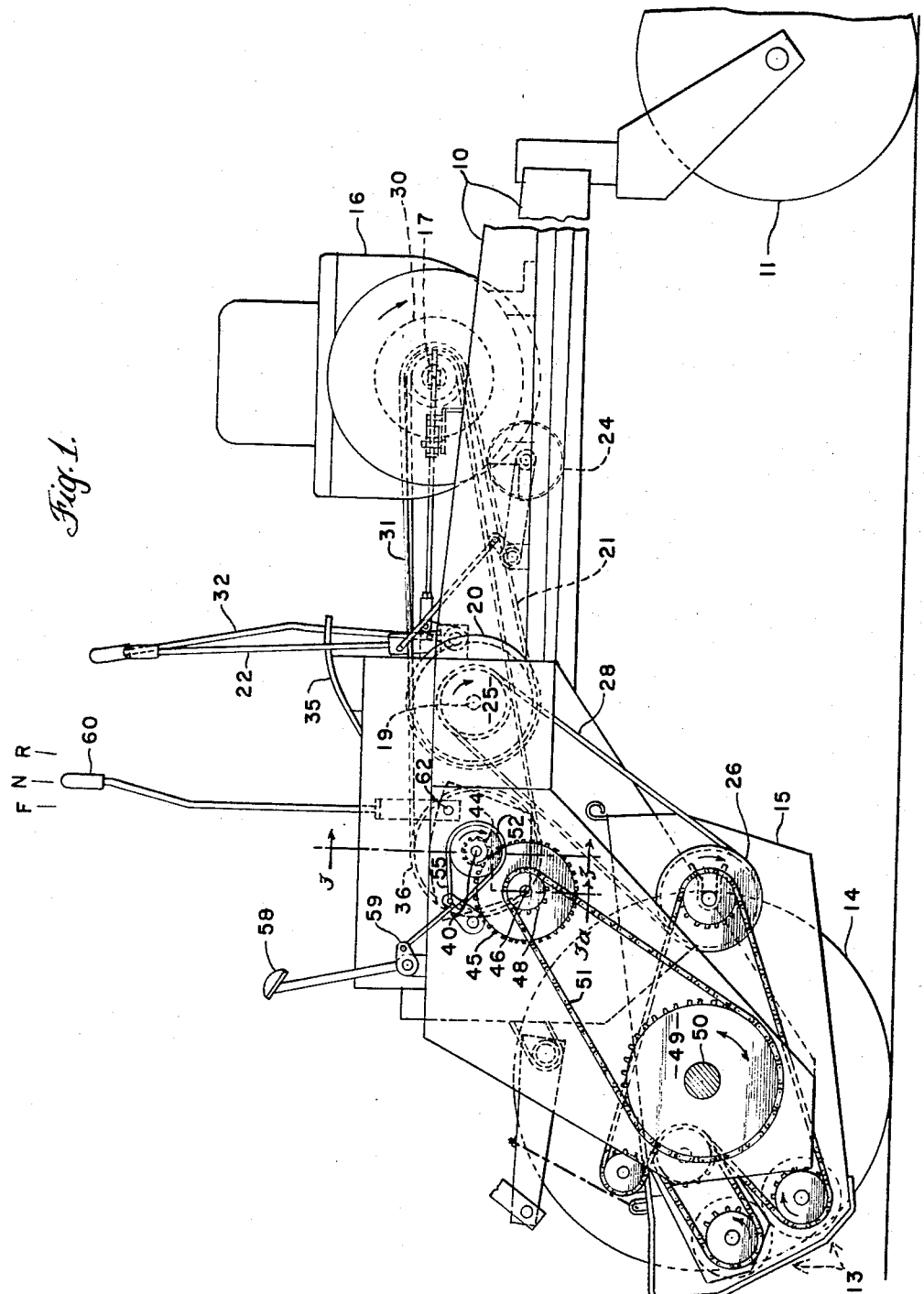

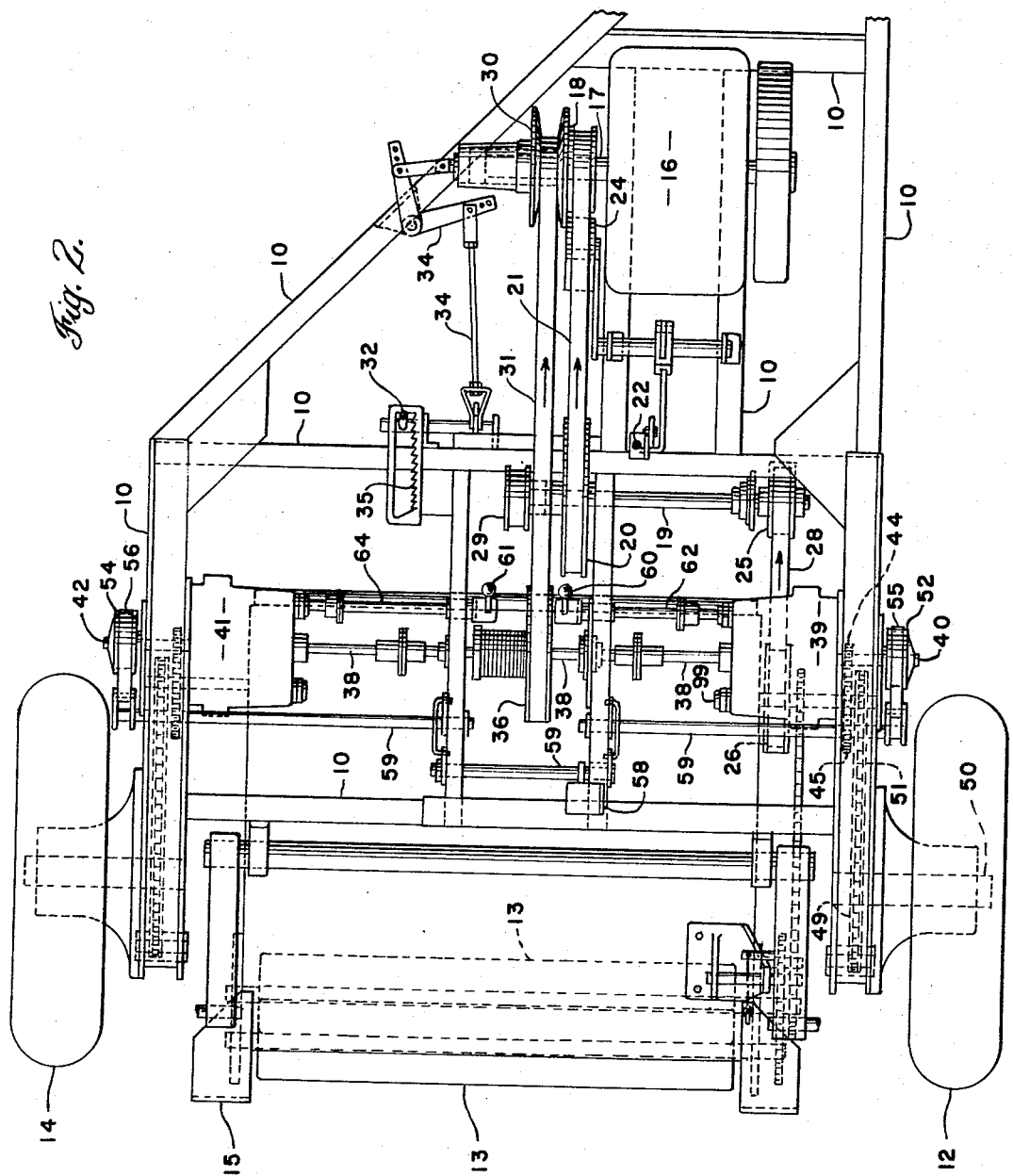

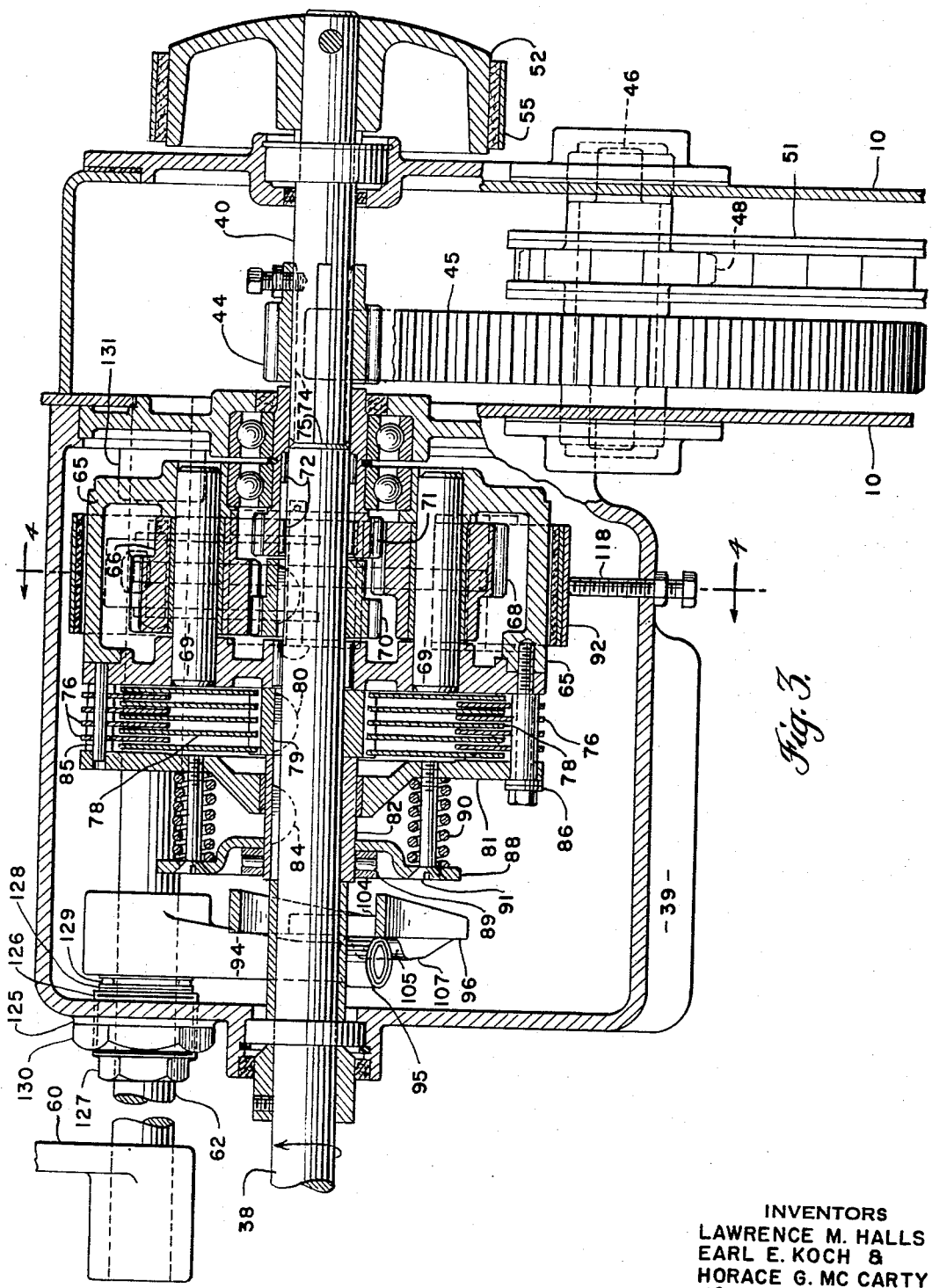

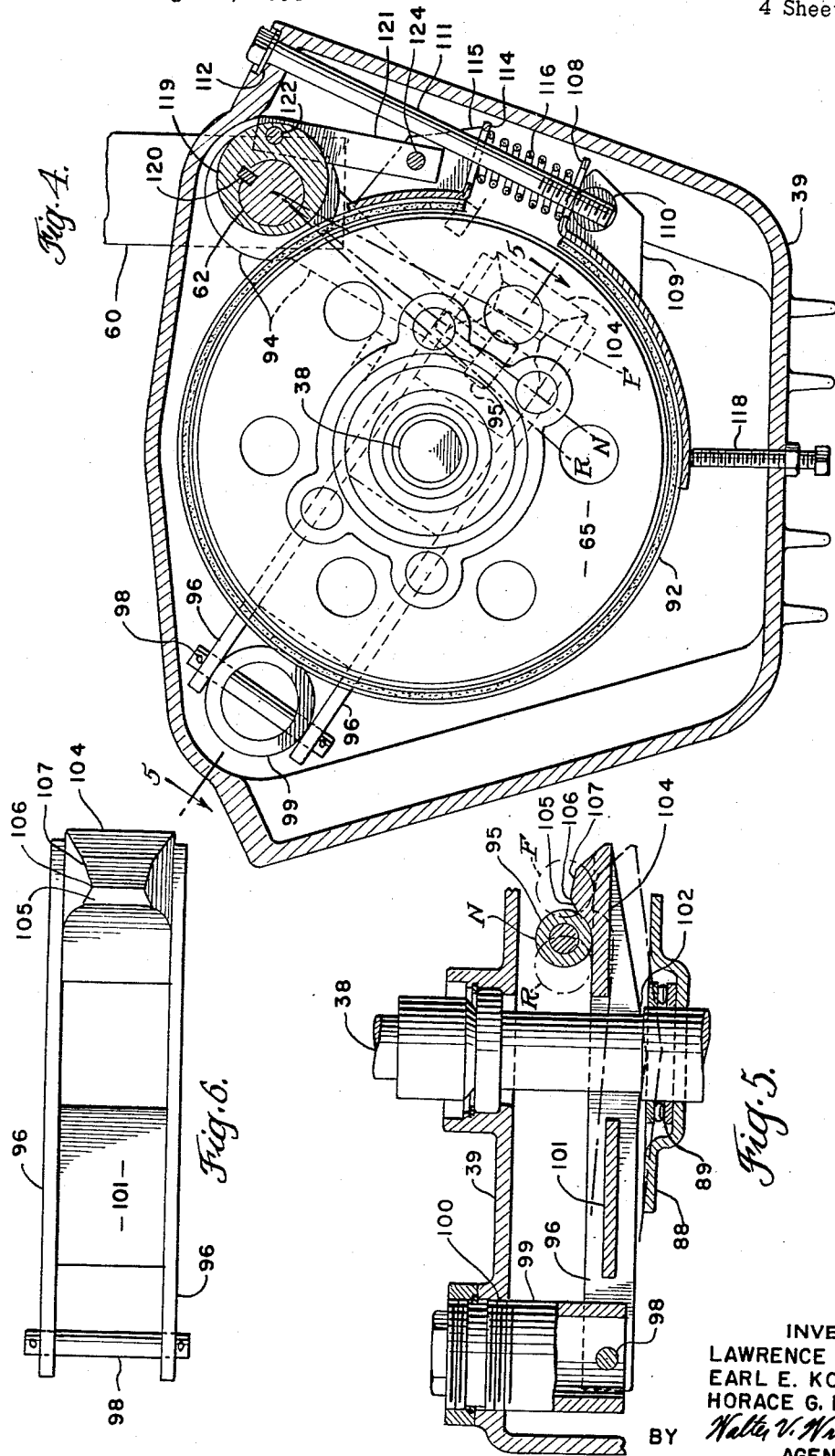

3,319,493
POWER TRANSMISSION CONTROL MEANS
Lawrence M. Halls, New Holland, Earl E. Koch, Mohnton, and Horace G. McCarty, New Holland, Pa., assignors to Sperry Rand Corporation, New Holland, Pa., a corporation of Delaware
Filed Aug. 31, 1964, Ser. No. 393,210
3 Claims. (Cl. 74—792)

This invention relates to power transmission control mechanism. It is particularly adapted for use in the driving and steering system of self propelled agricultural machines known as windrowers, or swathers, although other uses will be readily envisionable to those skilled in the art.

Windrowers have a mobile frame shaped like a right triangle when viewed in plan, with the base of the triangle being the front of the machine. A larger traction wheel is mounted at each side of the frame at the front thereof. A single caster-type wheel supports the frame at the rear. It is generally disposed behind the left traction wheel. A removable header unit attachable to the front of the frame includes mechanism for mowing a wide swath of standing crop material, consolidating the swath after it is cut and depositing the swath back onto the ground in the form of a windrow at the center of the header. The main reason for the offset location of the single rear wheel is to enable the machine to maneuver without the rear wheel running over the windrow. These machines frequently also carry a conditioner attachment which cracks or crushes the stems of the crop material to facilitate drying.

Windrowers must be highly maneuverable to operate well into the corners of fields and close to obstacles without running over their previously formed windrows. Steering is accomplished by independently controlling the transmission of forward and reverse driving power to the two traction wheels. This is done by two or more manually manipulatable levers which operate belt tighteners, brake bands, clutches and the like through relatively complex linkage systems which are very difficult to adjust and keep in proper adjustment. In addition to being exposed to the corrosion effects of the dust and grit, which both necessitates and hampers adjustment, the linkage systems generally involve lost motion and deflection between the many parts which results in the need for large control lever travel while detracting from the operator's ability to positively sense, or feel, the machine's responsiveness to the controls. Some of these control systems are spring loaded to the forward drive position which enables the machine to run away should the operator lose his grip on the controls.

It is an object of this invention to provide power transmission control mechanism which is mechanically simpler than previous systems.

It is another object of this invention to provide power transmission control mechanism which is compact and wherein all the relatively movable parts are enclosed within a sealed power transmission housing and operate in oil.

It is another object of this invention to provide power transmission control mechanism which is quicky acting and positive in response to control lever operation.

It is another object of this invention to provide power transmission control mechanism requiring only relatively short handle travel of a single control lever to control both forward and reverse driving power.

It is another object of this invention to provide power transmission control mechanism which is easy to adjust and keep in proper adjustment.

It is another object of this invention to provide power transmission control mechanism which will normally return itself to a neutral, or non-driving position, but which includes selectively operable and easily releasable holding means to hold the control mechanism in forward driving position.

It is another object of this invention to provide power transmission control mechanism which is rugged and dependable in operation, has a long low maintenance service life and is capable of being manufactured at low cost.

These and other objects and advantages of this invention will be apparent upon reference to the following description and claims taken in conjunction with the accompanying drawings wherein:

FIG. 1 is a side elevational view of a windrower tractor unit with the header omitted and embodying power transmission control mechanism constructed in accordance with the principles of the present invention;

FIG. 2 is a plan view of the windrower tractor unit shown in FIG. 1;

FIG. 3 is a cross sectional view taken on the line 3—3 of FIG. 1 and showing the left planetary power transmission unit;

FIG. 4 is a cross sectional view taken on the line 4—4 of FIG. 3;

FIG. 5 is a cross sectional view taken on the line 5—5 of FIG. 4;

FIG. 6 is a view of the cam carrying clutch actuator member shown in FIG. 5 as it appears when looking in the direction of the power shaft axis.

Referring now to the drawings in detail, particularly FIGS. 1 and 2: the reference numeral 10 is applied to various frame members of the windrower tractor unit shown in these figures. The frame is supported at the rear by a single caster-type wheel 11. The front end of the tractor unit is supported by a larger left traction wheel 12 and an identical traction wheel 14 on the right side of the frame. The windrower header unit which includes means to mow standing crop material and consolidate the material into a windrow at the longitudinal center of the machine, may be considered as conventional for the purposes of the present invention and has been omitted from the drawings. A crop conditioner attachment 15 is shown mounted in operative position on tractor frame 10 between left and right traction wheels 12 and 14. The header unit (not shown) would be mounted on the tractor frame 10 and disposed forwardly of conditioner unit 15 whereby the windrow discharging from the rear center of the header would pass between the conditioning rolls 13 visible in phantom lines in FIG. 1 at the lower left corner of that figure.

An engine 16 having a main drive shaft 17 is carried by frame members 10 near the rear of the tractor unit. A standard belt pulley 18 is carried by main engine shaft 17 adjacent the engine and serves to drive a jack shaft 19 through a large jack shaft pulley 20 by an endless belt 21. The jack shaft drive is engaged and disengaged by a control handle 22 which operates a conventional belt tightener pulley 24 through conventional linkage visible in solid lines in FIG. 2 and in phantom lines in FIG. 1. On the left end of jack shaft 19, relative to the direction of travel of the machine, is an output pulley 25 which drives the conditioner unit pulley 26 by an endless belt 28. The conditioner drive train from pulley 26 to conditioner rolls 13 is clearly visible in FIG. 1, but does not constitute the part of the present invention. Carried by jack shaft 19 at the right end thereof, is a power output pulley 29 which drives a belt (not shown), to operate the mowing and consolidating means on the header unit which is also not shown.

Carried on engine shaft 17 adjacent pulley 18 is a main drive split pulley 30 which is operated to drivingly engage or disengage a main drive belt 31 by operation of a manual control lever 32 which operates split pulley 30 through conventional linkage 34 best seen in FIG. 2. A conventional ratchet type latch plate 35 holds control lever 32 in the proper operating position selected by the tractor operator. Main drive belt 31 drives a spring loaded split pulley 36 carried by a transversely extending main power shaft 38. Power shaft 38 serves as the power input shaft of a left planetary transmission unit 39 having a power output shaft 40 and a right planetary transmission unit 41 having an output shaft 42. Referring now to FIG. 1, a small spur gear 44 is carried by left transmission unit output shaft 40. Spur gear 44 drives a larger direction reversing gear 45 carried by a short countershaft 46 which is journalled on the tractor frame. A sprocket 48 on shaft 46 is driven by gear 45 and, in turn, drives a large sprocket 49 on left traction wheel axle 50 through an endless chain 51.

It will be apparent from FIG. 2 that the drive to right traction wheel 14 from right transmission unit output shaft 42 is identical to that just described for left traction wheel 12. A parking brake drum 52 is carried by left transmission output shaft 40 on the left outboard side of tractor frame 10. An identical parking brake drum 54 is carried by the right transmission output shaft 42 on the right outboard side of the tractor frame. Coacting brake bands 55 and 56 respectively encircling brake drums 52 and 54 complete the parking brake mechanism. Both parking brakes are actuated by a foot peddle 58 through conventional linkage 59 best seen in FIG. 2.

In operation, the tension of main drive belt 31 is set according to operating conditions by manipulation of split pulley 30 through linkage 34 from manual control lever 32; then steering is accomplished by controlling forward and reverse transmission of power to left and right traction wheels 12 and 14 by left and right planetary transmission units 39 and 41. Forward and reverse power transmission through left planetary transmission unit 39 is controlled by a left transmission control lever 60 (FIG. 2) fixedly connected to a left transmission control shaft 62 which is journalled on the tractor frame and the housing of left planetary transmission unit 39. Forward and reverse power output from right planetary transmission unit 41 is controlled by a right transmission control lever 61 fixedly carried on right transmission control shaft 64 which is journalled on tractor frame 10 and on the housing of right planetary transmission unit 41.

Referring now to FIG. 3, which shows a section through left transmission unit 39 looking toward the rear of the machine as indicated by the arrows on line 3—3 of FIG. 1, and in conjunction therewith FIGS. 4–6: the planetary transmission is of a well known type having a planet gear carrier 65 in which are journalled two sets of planet gears. Visible above power input shaft 38 in FIG. 3 is the driving planet gear 66 of one of the planet gear sets. Visible below power input shaft 38 is the driven planet gear 68 of the other planet gear set. The planet gears are journalled on pins 69 carried by planet gear carrier 65. A power input pinion 70 is keyed to power input shaft 38 and meshes with the driving planet gears of each set (see gear 66). The driving planet gear of each set meshes also with its corresponding driven planet gear. The driven planet gear of each set (see gear 68) meshes with a power output gear 71. Power output gear 71 is in the form of an axially elongated sleeve which is journalled for free rotation relative to power input shaft 38 on needle bearings 72 and is drivingly connected to power output shaft 40 by splines indicated at 74. The end of power input shaft 38 and the beginning of coaxial power output shaft 40 is indicated at 75.

The left (as viewed in FIG. 3) face of planet gear carrier 65 carries a series of driven clutch plates 76 which are inter-leaved with a series of driving clutch plates 78 whose carrier sleeve 79 is keyed at 80 to power input shaft 38. A clutch face plate 81 is journalled on a sleeve 82 keyed at 84 to power input shaft 38. The usual clutch guide pins 85 (one shown), clutch disengaging springs (not shown) on pins 85, and stops 86 are provided to coact between clutch face plate 81 and the left face of planet gear carrier 65. A clutch thrust plate 88 and bearing 89 are slidably carried on sleeve 82. Preloaded springs 90 are carried by the thrust plate stop bolts 91 as is known in the clutch art. An expandable and contractable brake type reversing band 92, which will be more fully described hereafter, is disposed to coact with the outer periphery of planet gear carrier 65.

The power input shaft 38 is continuously driven in the direction indicated by the arrow thereon at the left of FIG. 3 when the machine is in operation. With the clutch disengaged, as shown, and the reversing band in expanded condition, as shown, the power input pinion 70, which is keyed to power input shaft 38, drives the driving planet gears (of which gear 66 is an example). The driving planet gears drive the driven planet gears (of which gear 68 is an example); and the driven planet gears which mesh with power output gear 71, drive the planet gear carrier 65 around the coaxial power input and power output shafts through the pins 69 thereby transmitting no driving power to power output gear 71. The power output shaft 40 is in a neutral, or non-driven, state.

When the clutch is engaged, it drives the planet gear carrier 65 about shaft 38 at the same speed as power input pinion 70. This stops the relative rotation between power input pinion 70, driving planet gears 66 and driven planet gears 68, and causes driven planet gears 68 to rotate power output gear 71 by the power transmitted from planet gear carrier 65 to driven planet gears 68 through the gear mounting pins 69. The rotation of power output gear 71, and therefore power output shaft 40 is in the same direction as power input shaft 38. When this driving power travels through small gear 44, direction reversing gear 45, sprocket 48 and chain 51 to the left traction wheel sprocket 49, it drives the left traction wheel 12 in a forward direction.

When the clutch is disengaged and the brake, or reversing, band 92 is contracted against planet gear carrier 65, it prevents rotation of the planet gear carrier. The power then travels from power input shaft 38 through power input pinion 70 to driving planet gears 66, then to driven planet gears 68 and from there to power output gear 71. Power output gear 71 is driven in the opposite direction from power input shaft 38. When this motion travels through the drive train from power output shaft 40 to left traction wheel driving sprocket 49, it drives the left traction wheel in reverse.

No particular novelty is claimed in the planetary transmission unit, per se, just described. The present invention, and the objectives achieved thereby, relate to the means by which the above described operation of the clutch and reversing band are achieved. It will be noted in FIGS. 3 and 4 that the power transmission control shaft 62 extends into the power transmission housing 39 and is journalled thereon. A short rigid arm 94 is fixed to the control shaft 62 just inside housing 39. The arm 94 extends radially from shaft 62 and carries a cam roller 95 on its radially outer end. A clutch actuator member in the form of a double armed lever 96 (see FIGS. 4 and 5) is disposed within housing 39 between arm 94 and clutch thrust bearing 89. One end of lever 96 is carried by a pivot pin 98 mounted in a plug 99 which is received in threaded aperture 100 in one end of housing 39. The axis of pivot pin 98 lies in a plane transaxial to input shaft 38 and extends at right angles to the axis of the input shaft. In this manner, clutch actuator 96 is mounted for movement along the axis of the power input shaft toward and away from the planetary transmission unit. In FIG. 6 it is seen that actuator lever 96 is actually a double parallel arm lever whose arms are interconnected near the center thereof by a rigid plate 101. This construction enables the two arms of actuator 96 to lie on opposite sides of the power input shaft 38 as may be seen in FIGS. 4 and 5. The arms of actuator 96 are provided, on the side thereof toward the planetary transmission unit, with thrust surfaces 102 (FIG. 5) which engage and push thrust bearing 89 axially along input shaft 38 to actuate the clutch. A cam plate 104 is fixedly carried between the arms of actuator 96 at the ends thereof opposite pivot mounting pin 98. Cam plate 104 has a first cam surface 105 (FIG. 5) which is engaged by cam roller 95 upon oscillation of arm 94 and control shaft 62 in one direction from the predetermined neutral position indicated by the solid line showing of cam roller 95 in FIG. 5.

Cam surface 105 extends at an angle between parallel and perpendicular to power input shaft 38 whereby oscillation of arm 94 in its plane transaxial to shaft 38 acts through cam roller 95 to produce axial movement of clutch actuator 96. This motion is transferred through actuator thrust surfaces 102 to the clutch thrust bearing 89 to actuate the clutch. The parts are returned to he neutral position by the clutch return spring which are not shown. Cam surface 105 terminates in a peak 106. Beyond peak 106 is a second cam surface 107 which is inclined slightly in the opposite direction from surface 105. This is a holding surface. Oscillation of arm 94 to move cam roller 95 beyond the predetermined extent represented by cam peak 106 causes roller 95 to move onto surface 107. From the surface 107 the roller 95 will not move back over peak 106 under the action of the clutch return springs. The surface 107 is used primarily for cruising type operation when the machine is moving in a straight path. In an emergency, the operator need only move control lever 68 a slight amount to carry roller 95 back over peak 106 whereupon the clutch springs will return the control lever to neutral. The slight extent of movement required of planetary transmission control lever 60 to change the power transmission from the forward cruising hold position to full reverse is apparent from the lines indicated F, N and R in FIG. 4 which correspond to the angles of oscillation required of control shaft 62 for forward, neutral and reverse power transmission.

The previously mentioned brake, or reversing, band 92 is of a semirigid type. It substantially encircles the outside peripheral surface of planet gear carrier 65. In FIG. 4 it may be seen that a first lug 108 is carried by by one end of band 92 and projects radially away from planet gear carrier 65. Lug 108 has a pair of spaced apart ears 109 (one visible) between which extend a bar 110 having a diametral threaded aperture therethrough. A long bolt 111 is threaded into bar 110 and has its head seated on a flat anchoring surface 112 on the outside of transmission housing 39 thereby fixing the position of lug 108 and its end of reversing band 92. Adjustment of the reversing band to take out slack resulting from wear is accomplished merely by turning bolt 111 whose head is disposed outside housing 39 at anchoring surface 112. A lug 114 having ears 115 is carried by the other end of band 92. A compression spring 116 is disposed between lugs 108 and 114 and biases band 92 to the expanded condition. An adjustable stop bolt 118 extending through the bottom of housing 39 supports lug 108 thereby preventing band 92 from dropping under gravity and dragging on the top of planet gear carrier 65 when in expanded condition. An eccentric lug 119 is keyed at 120 to the control shaft 62. This key connection allows limited relative movement between lug 119 and shaft 62 along the axis of shaft 62, but not circumferentially of the shaft. A rigid link 121 has one end pivotally connected by pin 122 to eccentric lug 119 and the other end pivotally connected by a pin 124 to the ears 115 of lug 114. From FIG. 4, wherein the arm 94, roller 95 and cam plate 104 are visible in phantom lines, it will be apparent that oscillation of control shafts 62, from the neutral position shown, in the opposite direction from that required to operate clutch actuator 96 will act through eccentric 119, link 121 and ears 115 of lug 114 to contract reversing band 92. Upon release of control shaft operating lever 60 from reversing position, the compression spring 116 will expand band 92 and act through link 121 to return shaft 62 and control lever 60 to the neutral position.

In FIG. 3, at the top left corner thereof, it may be seen that an external boss 125 is provided on transmission housing 39 where shaft 62 enters the housing. Boss 125 is internally threaded and receives an externally threaded sleeve 126 through the bore of which shaft 62 passes. The axially outer end portion of sleeve 126 is provided with a hexagonal configuration 127 to receive a wrench. The other end of sleeve 126, which is inside housing 39 engages spacer shims 128 (two shown). A needle bearing 129 has one side abutting arm 94 and the other side abutting shims 128. The shims are necessary in the assembly merely to compensate for variations between housing castings 39. An internally threaded locking cap 130 is received on the externally threaded sleeve 126 and abuts the axial flat external surface of boss 125 to lock sleeve 126 in fixed position. Adjustment of arm 94 to compensate for wear in the parts associated with the clutch actuating function is accomplished by first loosening locking cap 130, then turning sleeve 126 into the housing 39 by utilizing a wrench on the hexagonal outer end 127 of sleeve 126. The other end of sleeve 126 pushes against arm 94 through shims 128 and bearing 129. Since arm 94 is fixed to shaft 62 in both the axial and circumferential directions, axial movement of sleeve 126 moves the entire shaft 62 into housing 39 to carry arm 94 to the right as viewed in FIG. 3. The key connection between shaft 62 and eccentric lug 119 (FIG. 4) allows axial movement of shaft 62 relative to the eccentric lug. At the right inside end of housing 39 an internal boss 131 is visible in FIG. 3. This boss journals shaft 62 with sufficient end clearance to accommodate the axial movement of shaft 62 occurring upon adjustment of sleeve 126. The sleeve 126, shaft 62 and arm 94 are locked in the adjusted axial position by tightening locking cap 130 against exterior housing boss 125.

Without resorting to individual identification by separate reference numerals, it will be apparent in FIGS. 3 and 5 that all apertures into housing 39 are provided with seals. The housings are also provided with covered oil filler openings (not shown) whereby with the compact transmission control mechanism of this invention not only the planetary gear unit, the clutch unit and the reversing band, but also all the moving parts of the control linkage, operate in oil within the individual power transmission housings.

The right power transmission unit 41 for right traction wheel 14 is controlled by mechanism identical to that described for left power transmission unit 39. The right control lever 61 and right control shaft 64 may be seen in FIG. 2. With the compact control mechanism of this invention, all the relatively movable parts of the power control linkage are protected from the corrosive effects of dust and weather. The linkages are all short and rigid for ruggedness and deflection free operation thereby providing positive fast response to operation of the control levers. The mechanical simplicity of the control mechanism lends itself to low manufacturing cost and long low maintenance service life. Wear compensating adjustment of all the power transmission controls is readily accomplished from outside the sealed housing.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. In combination with a planetary power transmission unit having a power input shaft, a power output shaft, an engageable and disengageable clutch operable when engaged to effect driving of said output shaft in one direction from said input shaft through said planetary transmission unit, a clutch actuator member movable along said input shaft to effect engagement and disengagement of said clutch, an expandable and contractable band encircling said planetary transmission unit and operable upon contraction to effect driving of said output shaft from said input shaft through said planetary transmission unit in the direction opposite said one direction, means for controlling the direction of power transmission from said input shaft to said output shaft comprising a control shaft extending generally parallel to said input shaft and journalled for oscillation about its own axis, an arm fixed to said control shaft and extending radially therefrom, interengageable cam and cam engageable means on said arm and said clutch actuator member operable to move said actuator member along said input shaft to effect engagement of said clutch in response to oscillation of said control shaft in one direction from a predetermined neutral position, a link having one end connected eccentrically to said control shaft and the other end connected to said expandable and contractable band and operable to contract said band upon oscillation of said control shaft from said predetermined neutral position in the direction opposite said one direction, said expandable and contractable band having first and second ends spaced apart circumferentially along said planetary transmission unit, a first lug carried by said band at said first end thereof, a second lug carried by said band at said second end thereof, means holding one of said lugs in a fixed position, said link being connected to the other of said lugs and moving said other lug toward said one lug upon oscillation of said control shaft from said predetermined neutral position in the direction opposite said one direction, and a compression spring disposed between said lugs and biasing said band to expanded condition and thereby biasing said control shaft to said predetermined neutral position.

2. In combination with a planetary power transmission unit having a power input shaft, a rotatable planet gear carrier, and an expandable and contractable brake band substantially encircling said planet gear carrier and operable upon contraction to engage the planet gear carrier and prevent rotation thereof, said brake band having first and second ends spaced apart along the circumference of said planet gear carrier, control means for said brake band comprising a first lug on said first end of the brake band extending radially away from said planet gear carrier, a second lug on said second end of the brake band extending radially away from said planet gear carrier, means holding one of said lugs in a predetermined fixed position, a compression spring disposed between said lugs and biasing said brake band to expanded condition, a control shaft extending parallel to said input shaft in close proximity to said planet gear carrier and journalled for oscillation about its own axis, a rigid link, means pivotally connecting one end of said rigid link eccentrically to said control shaft, means pivotally connecting the other end of said rigid link to said other lug whereby upon oscillation of said control shaft in one direction about its own axis said rigid link moves said other lug toward said fixedly held lug in opposition to said compression spring thereby contracting said brake band.

3. In power transmitting mechanism, the combination of a housing having a plurality of apertures, a planetary power transmission unit disposed within said housing and having a power input shaft and a power output shaft, said power input shaft extending from said planetary transmission unit outside said housing through one of said plurality of apertures, said power output shaft extending from said planetary transmission unit outside said housing through one of said plurality of apertures, an engageable and disengageable clutch disposed within said housing and operable when engaged to effect driving of said output shaft in one direction from said input shaft through said planetary tarnsmission unit, a clutch actuator member disposed within said housing and movable along said input shaft to effect engagement and disengagement of said clutch, an expandable and contractable band within said housing encircling said planetary transmission unit and operable upon contraction to effect driving of said output shaft from said input shaft through said planetary transmission unit in the direction opposite said one direction, means for controlling the direction of power transmission from said input shaft to said output shaft comprising a control shaft, means journalling said control shaft in said housing for oscillation about its own axis, said shaft having a first portion disposed outside said housing and a second portion disposed within said housing and extending parallel to said input shaft, an arm disposed inside said housing and fixed to said second portion of said control shaft, said arm extending radially from said control shaft, interengageable cam and cam engageable means on said arm and said clutch actuator member operable to move said actuator member along said input shaft in a direction to effect engagement of said clutch in response to oscillation of said control shaft in one direction from a predetermined neutral position, a link disposed within said housing and having one end connected eccentrically to said second portion of said control shaft and the other end connected to said expandable and contractable band and operable to contract said band upon oscillation of said control shaft from said predetermined neutral position in a direction opposite said one direction, a manually operable lever disposed outside said housing and connected to said first portion of said control shaft for oscillating said control shaft about its own axis, said means journalling said control shaft in said housing comprising a sleeve having a smooth axial inner bore through which said control shaft extends, said sleeve having one end inside said housing in abutting relation to said arm and the other end disposed outside said housing, said sleeve having a threaded exterior surface threaded into said housing whereby rotation of said sleeve relative to said housing in one direction exerts axial thrust on said arm by said one end of said sleeve to move said arm and said shaft axially relative to said housing to effect clutch actuating adjustment, and a member threaded onto the exterior surface of said sleeve outside said housing and abutting said housing to normally lock said sleeve in fixed relation to said housing.

References Cited by the Examiner

UNITED STATES PATENTS

| | | | |
|---|---|---|---|
| 719,578 | 2/1903 | Fraser | 188—77 |
| 1,041,010 | 10/1912 | Brownell | 192—93 |
| 2,197,248 | 4/1940 | Bonham et al. | 74—720.5 |
| 2,263,064 | 11/1941 | Allin | 192—17 |
| 2,587,015 | 2/1952 | Walter | 192—17 |
| 2,660,278 | 11/1953 | Landwier | 192—93 |
| 2,714,826 | 8/1955 | Jasper. | |

BENJAMIN HERSH, *Primary Examiner.*

J. A. PEKAR, *Assistant Examiner.*